Figure 1:
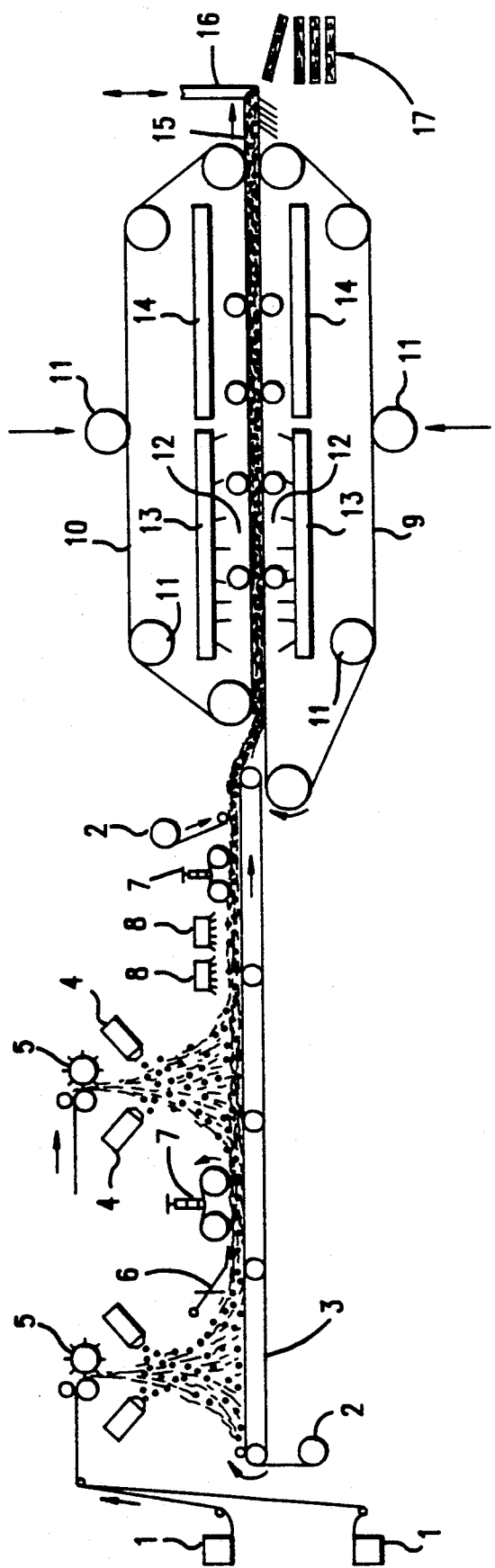

United States Patent [19]

Bastioli et al.

[11] Patent Number: 5,145,626
[45] Date of Patent: Sep. 8, 1992

[54] PROCESS FOR THE CONTINUOUS MANUFACTURE OF THERMOMOLDABLE THERMOPLASTIC COMPOSITE MATERIALS

[75] Inventors: Catia Bastioli, Novara; Gianfranco Del Tredici, Sesto Calende, both of Italy

[73] Assignee: Montedison S.p.A., Milan, Italy

[21] Appl. No.: 670,466

[22] Filed: Mar. 13, 1991

Related U.S. Application Data

[63] Continuation of Ser. No. 307,163, Feb. 6, 1989, abandoned, which is a continuation of Ser. No. 18,450, Feb. 25, 1987, abandoned.

[30] Foreign Application Priority Data

Mar. 3, 1986 [IT] Italy .................. 19610 A/86

[51] Int. Cl.$^5$ .................... B29C 43/28; B29C 43/22
[52] U.S. Cl. .................... 264/112; 264/113; 264/119; 264/120; 264/122
[58] Field of Search ............... 264/112, 113, 119, 120, 264/122

[56] References Cited

U.S. PATENT DOCUMENTS

| | | | |
|---|---|---|---|
| 2,356,826 | 8/1944 | Coss et al. | 264/122 |
| 2,543,101 | 2/1951 | Francis | 264/112 |
| 3,150,215 | 9/1964 | Houghton | 264/115 |
| 4,295,907 | 10/1981 | Cordts et al. | 264/112 |
| 4,396,566 | 8/1983 | Brinkmann et al. | 264/70 |

FOREIGN PATENT DOCUMENTS

| | | |
|---|---|---|
| 0046526 | 3/1982 | European Pat. Off. . |
| 1956038 | 5/1971 | Fed. Rep. of Germany . |
| 2948235 | 6/1980 | Fed. Rep. of Germany . |
| 2206829 | 8/1983 | Fed. Rep. of Germany . |
| 2140739 | 12/1984 | United Kingdom ............. 264/113 |

Primary Examiner—Mary Lynn Theisen
Attorney, Agent, or Firm—Morgan & Finnegan

[57] ABSTRACT

Process for the continuous manufacture of thermomoldable thermoplastic composite materials comprising feeding simultaneously on a conveyor belt a granulated thermoplastic polymer together with a reinforcement selected from natural, artificial and synthetic fibers, and compacting and heating under pressure the thus-obtained mixture.

14 Claims, 1 Drawing Sheet

PROCESS FOR THE CONTINUOUS MANUFACTURE OF THERMOMOLDABLE THERMOPLASTIC COMPOSITE MATERIALS

This is a continuation of co-pending application Ser.No. 07/307,163, filed on Feb. 6, 1989, now abandoned, which is a continuation of application Ser. No. 07/018,450 filed Feb. 25, 1987, now abandoned.

DESCRIPTION OF THE INVENTION

The present invention relates to a process for the continuous manufacture of thermomoldable thermoplastic composite materials.

More particularly, the present invention relates to a process for the continuous manufacture of slabs from thermomoldable, thermoplastic composite materials reinforced with natural, artificial or synthetic fibers.

Processes are already known in the art for preparing slabs from thermomoldable, thermoplastic composite material. For instance, in U.S. Pat. No. 949,133 and in German Patent No. 2,948,235 processes are described for preparing slabs from thermomoldable composite material obtained by inserting reinforcing layers among the sheets of the previously extruded polymer, the thus-obtained panel then being compressed under heat in such a manner as to allow the molten polymer to penetrate the reinforcing structure.

The reinforcement of glass fibers generally consists of small mattresses of cut fibers or of small monoyarn mattresses of continuous fibers. In particular, said reinforcements have a random structure, isotropic in the plane, and showing a plurality of cut or continuous filaments twisted in strands or dispersed in single monofilaments and kept together by chemical binders or by means of a needle quilting. Drawbacks of the above-mentioned processes are either poor economy in that the reinforcement must be separately prepared and then assembled with the polymeric matrix, or poor hygenic environmental conditions due to pieces of glass filaments which are present in the needled structures.

Alternatively, other processes have been suggested, such as for instance, those described in UK Patent No. 1,010,043, in French Patent No. 1,361,439, or in U.S. Pat. No. 3,396,142; according to these processes a powdered thermoplastic matrix is fed after the preparation of the small fibrous mattress.

These processes also show drawbacks both of the hygenic type, due to the dust created by the use of polymeric powders, and of the economic type in that the milling operation of the granules and the subsequent drying of the powders are very expensive.

Furthermore, the use of powdered polymers may cause an absorption of oxygen and moisture by the polymer itself, with consequent problems involving thermoxidative and hydrolytic degradation, which consequently reduce the overall performance of the finished manufactured articles.

It has now been found that the above-mentioned drawbacks may be overcome by a process which consists or consists essentially in feeding, at the same time on a conveyor belt, the granulated thermoplastic polymer together with a reinforcement selected from natural, artificial or synthetic fibers, and in embedding and heating under pressure the thus-obtained composite structure.

Accordingly, the process of this invention provides the opportunity of obtaining slabs which during the further thermomolding operations have the filaments free to move one against the other and therefore able to uniformly distribute themselves without hindrance from resin creep.

The process for the continuous manufacture of thermomoldable thermoplastic composite materials of the present invention comprises:

(a) feeding on a conveyor belt a granulated thermoplastic polymer contemporarily with a reinforcement selected from organic or inorganic fibers to give a continuous mixed structure;

(b) beating and/or pressing the continuous felt thus obtained to reduce its thickness;

(c) compressing and gradually heating under pressure the continuous felt to melt the polymeric matrix; and (d) cooling under pressure the thus-obtained system.

According to an alternative, step (a) and/or step (c) may be preceded by the deposition, on the conveyor belt and/or on the compressed structure respectively, of a film of the same polymer type. This alternative may be carried out when the preparation of a thermomolding slab is desired that shall have an improved degree of surface finishing or to improve the detaching from the surfaces of the continuous pressing system (c) by introducing in the two films suitable detaching additives.

According to a still further alternative, in particular when the necessity exists of keeping a part of the polymer in the upper surface of the structure or to remove traces of moisture, if present, before step (b), one may carry out a pre-heating of the composite material, for instance by means of IR lamps, at a temperature near the softening temperature of the polymer.

The organic or inorganic fibers used in the present process may be continuous or cut fibers. In the case of cut fibers, the position of the optionally-present cutter must be established, in respect of the conveyor belt, at a height at least higher than 80 cm, in such a way as to obtain a distribution of the cut fibers in casual free fall and uniform distribution over the entire width of the belt.

The fibers and the granulated polymer are fed through at least one dosage-distribution system. In the event that several dosage-distribution systems are used, an analogous number of (b) operations is provided for each fiber and polymer feeding.

The beating operation has for its purpose favoring the penetration of the polymer inside the reinforcing structure, but it is also for the purpose of dispersing as much as possible the plurifilament forming the reinforcing structure into single monofilaments.

The beating operation may be carried out by means of rigid metallic blades or by means of a needle board system like the quilting operation. The beating system may act on one or on both surfaces of the reinforcing structure.

The compression carried out by means of calendars reduces the thickness of the reinforcing felt and its porosity. These operations are indispensable for obtaining a good quality of finished slab and may be indispensable especially if a first fiber-polymer distribution zone is followed by other like zones.

It is to be understood that beating and compression may or may not be complementary operations-their contemporaneous or single insertion being only dependent on the requirements of the process and final product.

In step (c) the working temperature must be at least thirty to fifty Centigrade degrees higher than the melting temperature of the polymer, whereas the pressure must be such as to insure the penetration of the melted polymer into the reinforcement.

Generally, the pressure melting of the material occurs by means of a continuous press provided with belts. In said press graduated heating zones to allow the matrix to melt and a cooling zone may be provided.

Based on the total weight of the composite material, the fibers which form the reinforcing structure may be from 10 to 60% by weight.

Any organic or inorganic fiber may be used for performing the process of the present invention. Examples of the fibers which may be used are glass fibers, rock fibers, carbon fibers, aramidic fibers, etc.; the preferred fibers are glass fibers.

Generally, the glass fibers used to form the reinforcing structure consist of continuous plurifilaments or, if cut, of staples having a length greater than 1 cm, and preferably in the range of 5 and 25 cm. Single fibers have a titer between 5 and 300 tex, and preferably between 5 and 25 tex, and may come directly from the cops or from rovings obtained by joining together many plurifilaments each having a titer between 100 and 3600 tex.

The number of filaments of the plurifilaments generally varies from 10 to 1800, and preferably from 20 to 200. Their diameter is between 5 and 25 microns, and preferably between 11 and 19 microns.

Generally, the fibers are sized with bridging or adhesive agents based on organofunctional silanes, and thus able to give a good interface binding with the polymeric matrix.

If the reinforcing structure consists of continuous filaments they are laid down by means of a roll system on the surface of the conveyor in such a manner as to obtain a helicoidal structure having good isotropy in the plane.

When chopped plurifilaments are used, they are arranged and superimposed freely and randomly among themselves to obtain a glass-like carpet perfectly randomly arranged along all the directions of the plane. In this case the plurifilaments are generally linear throughout their length or show a minimum bending radius, generally higher than 20 cm.

Any thermoplastic polymer can be used to perform the process of the present invention, such as polyester resins, for instance polyethyleneterephthalate and polybutyleneterephthalate, the olefinic resins for instance polyethylene and polypropylene, vinyl resins such as polyvinylchloride, polyamidic resins, etc. However, preferred polymers are the resins having low viscosity and strong thermoxidative characteristics such as polyethyleneterephthalate or polybutyleneterephthalate or, more generally, polyester resins.

The polymeric matrix fed together with the fiber is in the form of granules, and preferably cylindrical granules. Their size is very important in order to achieve, also in the solid state, good penetration of the matrix into the interstices of the reinforcing structure. Either the diameter or the height will vary from 0.1 to 10 mm, and preferably the optimum size is from 2 to 4 mm.

According to the process of the present invention, it is possible to use inorganic fillers, dyeing agents, and like additives in suitable amounts for preparing the thermomoldable thermoplastic composite materials.

For instance, when slabs showing very smooth surfaces and improved flexion loads and/or flexion modulus are desired, it may be useful to disperse in the matrix short fibers of the same nature as the reinforcing structure, which therefore further reinforce the resin in the spaces not filled by the reinforcing structure.

Generally, these short fibers represent from 5 to 30% by weight of the composite material, but preferably they represent from 5 to 15%. Usually, the short fibers contained in the polymeric matrix have a length ranging from 30 to 1000 microns, and preferably from 50 to 400 microns.

The additives such as inorganic fillers, short fibers, pigments, etc., may be previously incorporated in the polymeric matrix and in this case the filler and the polymer are preblended and thereafter separately extruded to obtain granules having the desired size and then are uniformly fed according to the requirements of the present process.

To still better understand the process of the present invention, hereinbelow follows a more detailed description with reference to the accompanying drawing which shows an arrangement of the device by which the performance of the process of the present invention is facilitated and which includes the use of two polymer-fibers distribution zones.

The device comprises a conveyor belt 3 above which, at a suitable height, there are placed cylinders for cutting the fibers 5 together with the distribution devices for the granules 4.

Both the cutting cylinders 5 and the granules distributors 4 are arranged in such a manner to cover the entire width of the desired final slab 15 to be produced.

Near the belt there are provided a beating apparatus 6, two compressors 7 to compact and reduce the thickness of the fiber-polymer composite material, as well as an infrared ray system 8 for pre-heating.

At the side of the conveyor belt 3, on the same plane or on a slightly lower plane, a heat-pressing system is provided comprising two belts 9 and 10, driven by cylinders or rollers 11 and 12, a heating zone 13, and a cooling zone 14.

A system for cutting the slabs 16 is provided at the outlet of the cooling zone.

The glass fibers coming from cops or rovings 1 feed the cutter 5 and the chopped plurifilaments, while falling down from the cutter on the conveyor belt 3, are mixed with the granules of the polymer thrown by the distributors 4 which can be coupled or separately acting as desired.

In the arrangement shown in the figure, a covering polymeric film 2 is inserted between the conveyor belt 3 and the polymer-fiber system; if necessary, this element may be replaced by a surface felt feeder which allows one to improve the appearance of the slabs. The structure, consisting of the reinforcement and of the granules, is beaten with a suitable frequency by means of the beating apparatus 6 which not only improves the dispersion of the fibers into monofilaments but helps the penetration of the granules along the thickness of the reinforcement.

The first compressor 7 has the purpose of compressing the structure, thus reducing significantly the thickness and to show a smoother and flatter surface to the second fiber-polymer throwing zone.

According to the process shown in the figure, after the second throwing zone an infrared ray system 8 is provided, the purpose of which is to keep on the surface a part of the polymer, and a second compression system 7; the temperature on the surface of the slab is preferably fixed only slightly below the melting temperature of the polymeric matrix of the slab.

The insertion of a second surface covering film 2 may be provided to improve the appearance of the upper surface of the composite material. After the processing operations, the felt mixed with the granules goes on the conveyor belt of the continuous press; the passage may occur on the same plane or by falling down on a lower plane.

During the phase of pressing under heat, the polymer melts and penetrates intimately into the reinforcing structure; the thus-obtained composite material goes to the cooling zone 14 and at the end, the already set slab 15 is cut off by means of a cutter 16 in the desired sizes 17.

To still better understand the present invention and to practically perform the same, some illustrative examples are reported hereinbelow, which however are not intended to limit the present invention in any way.

EXAMPLE 1

Slabs of thermoplastic composite material based on polybutylenterephthalate reinforced with glass fibers E (30% by weight) are prepared by using the following parameters. Cops sized with epoxysilanes are used and the strand consists of 4 single 26 tex plurifilaments, which, when cut, open slightly.

Each 26 tex plurifilament consists of 200 filaments having a diameter of about 11.5 microns.

The length of the cut is 7.5 cm.

The intrinsic viscosity of the polymer in phenol-tetrachloroethane (70/30 by weight) is 0.8; the polymer is in the form of cylindrical granules having a diameter of 2.5 mm and a length of 3 mm coming from blending in an extruder the base polymer with graphic phosphites and phosphates as stabilizing agents.

48 cops of glass thread feed a cutter 5 while 2 vibrating dosage devices 4 feed the polymer, thus forming a blend consisting of 3120 g/m$^2$ of polymer and of 1370 g/m$^2$ of fiber which deposits on the belt 3 having a speed of about 0.5 meters per minute.

Before the falling zone of the main components, a film of extruded polymer 2 with a thickness of 150 microns (1.2% by weight based on the total composite material) is inserted.

The soft felt (thickness about 15 cm) is beaten, by means of a suitable apparatus 6 which improves the penetration of the granules, towards the lower surface and thereafter is compressed to reduce the thickness to about 6-7 cm.

Above the felt, a second polymer film (150 microns) is fed.

The felt, together with granules, falls on the belt of the continuous press which compresses it to about 3 bars. In the heating zone it remains for about 5 minutes with a final thermal peak of about 250° C. and then it is cooled in the second zone to a temperature of about 30° C.

In this way a composite material in the form of a flat slab is obtained. The slab shows isotropic characteristics along 3 main axes and is characterized by a thickness of 3 mm, width of 70 cm, density of 1.52 g/cm$^3$, weight of 4569 g/m$^2$, and a ratio by weight of polymeric matrix-fiber equal to 70/30.

EXAMPLE 2

There are prepared slabs of a thermoplastic composite with polyethyleneterephthalate (PET) reinforced with 26% by weight of glass fiber type E.

PET in granules, having an intrinsic viscosity in phenol-tetrachloroethane (70/30 by weight) of 0.78, is pre-blended, pre-mixed in the extruder with nucleating stabilizers and 5% by weight of short glass fibers, thus obtaining granules of 3×4.5 mm and a flat film of about 150 microns. This composite material in granules having a density of about 1.33 g/cm$^3$ is used as polymeric fraction of the final composite material in the slab.

The long glass fiber used as reinforcing element of the system is fed from cops, strands of about 300 tex consisting of plurifilaments each of 20 tex with filaments of 11.5 microns.

In comparison with Example 1, the process has been modified by using two zones for the cutting of the fiber and distribution of the polymer. In both zones the mixing ratio by weight was 74 parts of granules (master consisting of 95% polymer and 5% paper fiber) and 26 parts of fiber 15 cm length, corresponding to 1694 g/m$^2$ of granules and 605 g/m$^2$ of long fiber.

After the first and second zones of cutting-distribution, the insertion of a couple of IR lamps was useful which raised the surface temperature of the felt to about 255° C. Useful also was the insertion of 2 compressors of the felt which assisted in blocking the mixing of the components. The working pressure in the continuous press was about 8 bar with a stay in the heating zone of 5 minutes and a thermal peak of 280° C. The manufacturing speed was 0.5 meter/min and the final temperature of the slab about 35° C.

Finished slabs were obtained having a width of 70 cm, 3 mm in thickness, and a theroretical density of the composite material of 1.53 g/cm$^3$.

EXAMPLE 3

The same components are used as in Example 2.

The granule-fiber mixed felt was covered at the surface with two polymeric films containing 5% by weight of short fiber.

While continuing the distribution of the components in two zones the IR lamp for the pre-heating were removed and were replaced by two beating apparatus.

The qualitative results relating to the distribution of the polymer and the surface appearance were better in comparison with those of Example 2.

Although the invention has been described in conjunction with specific embodiments, it is evident that many alternatives and variations will be apparent to those skilled in the art in light of the foregoing description. Accordingly, the invention is intended to embrace all of the alternatives and variations that fall within the spirit and scope of the appended claims. The references are hereby incorporated by reference.

What is claimed is:

1. A process for the continuous manufacture of thermomoldable thermoplastic polyester composite materials comprising:
    (a) feeding on a conveyor belt a granular thermoplastic polyester, having a cylindrical shape and a diameter or height which varies from 0.1 to 10 mm, contemporaneously with a reinforcement selected from the class consisting of organic and inorganic fibers having lengths greater than 1 cm and fed in free fall from a height higher than 80 cm;

(b) beating the thus-obtained continuous felt to reduce its thickness;
(c) compressing and gradually heating under pressure the continuous felt to melt the polymeric matrix; and
(d) cooling under pressure the thus-obtained product.

2. A process according to claim 1, comprising the feeding, before step (a) or step (c) or both, respectively on the conveyor belt or on the compacted structure, a film of the same type of polymer.

3. A process according to claim 1 or claim 2, comprising pre-heating the composite structure before step (b).

4. A process according to claim 1 or claim 2, wherein the fiber is a glass fiber, a rock fiber, a carbon fiber or aramidic fiber.

5. A process according to claim 4, wherein the fiber is glass fiber.

6. A process according to claim 4, wherein the fiber is a continuous fiber or has a length greater than 1 cm.

7. A process according to claim 6, wherein the cut fibers are fed in free fall from a height higher than 80 cm onto the conveyor belt.

8. A process according to claim 1 or claim 2, wherein the polymer is selected from polyester, olefin, vinyl and polyamide resins.

9. A process according to claim 1, wherein the polymer is polyethyleneterephthalate or polybutyleneterephthalate.

10. A process according to claim 1 or claim 2, wherein in step (c) the working temperature is at least thirty to fifty Centigrade degrees higher than the melting temperature of the polymer.

11. A process according to claim 1 or claim 2, wherein the fibers are from 10 to 60% of the total weight of the composite material.

12. A process according to claim 1 or claim 2, wherein the granulated thermoplastic polymer contains inorganic fillers, dyestuffs or additives.

13. A process according to claim 1, wherein the fiber has a length between 5 and 25 cm.

14. A process for the continuous manufacture of thermomoldable thermoplastic polyester composite materials consisting essentially of:
(a) feeding on a conveyor belt a granular thermoplastic polyester, having a cylindrical shape and a diameter or height which varies from 0.1 to 10 mm, contemporaneously with a reinforcement selected from the class consisting of organic and inorganic fibers having lengths greater than 1 cm and fed in free fall from a height greater than 80 cm;
(b) beating or compressing or both the thus-obtained continuous felt to reduce its thickness;
(c) compressing and gradually heating under pressure the continuous felt to melt the polymeric matrix; and
(d) cooling under pressure the thus-obtained product; whereby during heating step (c) having the fibers free to move one against the other and able to uniformly distribute themselves without hindrance from resin creep.

* * * * *